United States Patent Office 3,310,599
Patented Mar. 21, 1967

3,310,599
CATALYTIC DEHYDROGENATION OF
PARAFFINIC HYDROCARBONS
Vladimir Haensel, Hinsdale, and James Hoekstra, Evergreen Park, Ill., assignors to Universal Oil Products Company, Des Plaines, Ill., a corporation of Delaware
No Drawing. Filed Feb. 14, 1966, Ser. No. 527,089
8 Claims. (Cl. 260—683.3)

The present invention relates to a process for effecting the dehydrogenation of saturated hydrocarbons to produce unsaturated hydrocarbons. More specifically, the invention herein described is directed toward a catalytic process for the dehydrogenation of a paraffinic hydrocarbon to the corresponding olefinic hydrocarbon, which process increases the degree and efficiency of conversion, and simultaneously decreases the degree to which undesirable side reactions take place. Through the practice of the present invention and the use of the novel catalytic composite described herein, an extended period of operation is afforded during which time the catalyst exhibits effective stability as a result of decreased carbon deposition thereupon.

The present invention is advantageously applied in a process for the dehydrogenation of propane, n-butane, isobutane, n-pentane, isopentane and various paraffinic hydrocarbons containing six or more carbon atoms per molecule. In many instances, with certain modifications which will be apparent to those having skill in the art of petroleum processing techniques, cycloparaffins may be dehydrogenated to produce the corresponding cycloolefins without incurring the undesirable consequences of ring-opening reactions.

The use of various olefins are numerous, and are applied with significant success in a wide variety of industries including the petroleum, petrochemical, heavy chemical, pharmaceutical, plastics industry, etc. For example, propylene is utilized in the manufacture of isopropyl alcohol, propylene dimer, trimer and tetramer, cumene, polypropylene, and in the synthesis of isoprene. Butene-1, cis-butene-2, and trans-butene-2 are extensively used in polymer and alkylate gasolines, in the manufacture of polybutenes, butadiene, aldehydes, alcohols, as solvents, cross-linking agents for polymers, and in the synthesis of various $C_4$ and $C_5$ derivatives. Isobutane finds use in the production of isooctane, butyl rubber, polyisobutene resins, tertiary butyl chloride, copolymer resins with butadiene, acrylonitrile, etc. Pentenes are primarily employed in organic synthesis, although alpha-n-amylene (1-pentene) is often used as a component blending agent for high octane motor fuel.

In order that a dehydrogenation process might achieve commercial success, the use of a suitable catalyst is required. Although thermal conversion of paraffins to the corresponding olefins can be effected, the main reaction becomes cracking, due to high temperature pyrolysis, which is undesirable from the standpoint of product quality and yield. At temperatures sufficiently low to avoid the deleterious cracking reactions, little or no thermal conversion to olefins takes place. The use of suitable catalysts avoids this difficulty by permitting relatively low temperature operation for dehydrogenation, thus avoiding the excessive cracking prevalent at the higher temperatures. The prior art processes for dehydrogenation are replete with suggestions of numerous catalysts which can be used in promoting low temperature conversion of paraffinic hydrocarbons to olefins. Such catalysts generally consist of one or more metallic components from the metals of Groups VI and VIII of the Periodic Table, and compounds thereof, and are employed either unsupported, generally in powder or small particle form, or supported or carried by a refractory inorganic oxide material. Thus, suitable catalytic composites have been found to comprise one or more components selected from chromium, tungsten, molybdenum, iron, cobalt, nickel, platinum, palladium, iridium, ruthenium, rhodium, osmium, and compounds thereof. These are generally composited with a carrier material comprising one or more inorganic oxides from the group of alumina, silica, zirconia, magnesia, thoria, hafnia, titania, boria, etc. Notwithstanding the wide variety of dehydrogenation catalysts, it becomes evident from a perusal of the prior art that any of the proposed catalysts appears to have inherently one or more drawbacks which detract from the suitability and acceptability thereof. Some are too active, and to the extent that undesirable side reactions are promoted even at low temperatures. Others are too inactive at low temperatures to promote an acceptable degree of dehydrogenation. Still others are insufficiently stable to be effective for an extended period of time, and, as such, do not foster a commercially attractive process.

In conjunction with the various difficulties involved in selecting a suitable dehydrogenation catalyst, there is the aspect of equilibrium to consider. Dehydrogenation is generally effected at conditions including a temperature in the range of from 400° C. to about 700° C., a pressure from 0 to 100 pounds per square inch gauge, a liquid hourly space velocity within the range of from about 1.0 to about 10.0, and in the presence of hydrogen in an amount to result in a mol ratio of from 1:1 to about 10:1, based upon the paraffin charge rate. When operating at or extremely close to equilibrium conversion, regardless of the character of the catalyst being used or the degree to which it successfully promotes dehydrogenation, various side reactions, including at least some cracking, are also effected. For instance, in the dehydrogenation of isobutane at close to equilibrium, a significant degree of isomerization to n-butane results. This, as well as other side reactions, obviously detrimentally affects the efficiency of conversion to isobutylene, and tends to adversely affect the economics of the process.

One object of the present invention is to provide a paraffin dehydrogenation process which can function at close to equilibrium without suffering from an excessive degree of side reactions leading to decreased efficiency, or cracking to form light paraffinic gases, or the deposition of carbon onto and within the catalyst, thereby shielding the active surfaces and centers thereof from the material being processed.

Another object is to provide a novel catalytic composite which affords particular advantages in a process for the dehydrogenation of paraffinic hydrocarbons, and which eliminates the necessity of utilizing any additives to the paraffinic charge stock. This avoids contamination of the product liquid and gas streams from components introduced to the process by way of such additives.

In a broad embodiment, therefore, the present invention affords a catalytic composite of alumina, lithium, a Group VIII noble metal component and a metallic component selected from the group consisting of selenium, tellurium, mixtures and compounds thereof.

In another embodiment, the present invention relates to a process for the dehydrogenation of a paraffinic hydrocarbon, which process comprises contacting said hydrocarbon with a catalytic composite of lithiated alumina, at least one metallic component from the metals of Group VIII of the Periodic Table, and a metallic component selected from the group consisting of selenium, tellurium and compounds thereof, at dehydrogenating conditions including a temperature within the range of from about 400° C. to about 700° C.

This process is further characterized in that a particularly preferred catalyst comprises lithiated alumina containing from about 0.05% to about 5.0% by weight of a Group VIII noble metal, and especially platinum. Although beneficial results are obtained at temperatures from about 400° C. to about 700° C., it is preferable to operate at an intermediate temperature of from about 525° C. to 625° C. The pressure will be in the range of 0 to about 100 p.s.i.g., and most normally at least about 10 p.s.i.g. The pressure will be maintained by compressive hydrogen recycle in an amount such that the mol ratio of hydrogen to hydrocarbon charge is from about 1:1 to about 10:1, the hydrocarbon charge rate being sufficient to give a liquid hourly space velocity (defined as volumes of hydrocarbon charge per volume of catalyst disposed in the reaction zone) of from 1.0 to about 10.0.

The fourth component of the catalyst of the present invention is a catalytic attenuator selected from the group consisting of selenium, tellurium, mixtures and compounds thereof. Tellurium is particularly preferred due to its capability to remain as an integral component of the catalyst during processing. These catalytic attenuators are employed in amounts based upon the concentration of the Group VIII metallic component. For example, tellurium will be used in an atomic ratio to platinum within the range of from 0.15 to about 0.50. It is understood that regardless of the precise form in which the various catalytic components exist, the concentrations are calculated on the basis of the elemental metals.

The preferred dehydrogenation catalyst of the present invention makes use of a refractory inorganic oxide carrier material with which is combined a Group VIII noble metal component and an alkali metal component. In some instances, the catalyst will contain an alkaline-earth metal component, including calcium, magnesium and/or strontium, although the alkali metals, cesium, rubidium, sodium, and especially lithium are preferred. The Group VIII noble metal, palladium, iridium, ruthenium, rhodium, osmium, and especially platinum, may be present as the element, as a chemical compound, or in physical association with the other catalyst components. In any event, the Group VIII metal will be present in an amount of from about 0.05% to about 5.0%, calculated as if existing as the elemental metal. The alkali metal, or alkaline-earth metal, will be utilized in an amount not generally exceeding 5.0% by weight; in order to achieve a proper balance between inhibiting the occurrence of side reactions, and imparting the desired degree of stability, it is preferred to employ the alkali metal in significantly lower concentrations. Therefore, the alkali metal component will be present in a concentration within the range of from about 0.01% to about 1.5% by weight, calculated as the element thereof. It is preferable to utilize alumina as the sole component of the carrier material, without the addition thereto of acidic components which tend to promote hydrocracking reactions. Such acidic components include silica, and especially the members of the halogen family, particularly chlorine and/or fluorine. The utilization of the other inorganic oxides, in combination with the alumina, is primarily dependent upon the desire to impart thereto certain physical and/or chemical characteristics, under certain situations involving particular paraffinic charge stocks.

The catalyst for use in the present process may be prepared in any suitable manner, and it is understood that the particular method chosen is neither essential to, nor limiting upon the present invention. In general, the alumina carrier material will be prepared and formed into the desired size and shape. The alkali metal, or alkaline-earth metal is then added as an aqueous solution thereof, and thus may comprise a chloride, sulfate, nitrate, acetate, etc. Similarly, the platinum component, or other Group VIII noble metal, may be composited in any suitable manner, one particularly convenient method involving the use of an impregnating solution of a water-soluble platinum compound. The impregnated carrier is then dried at a temperature of from 100° F. to 300° F., and thereafter subjected to a calcination treatment at an elevated temperature of from 800° F. to about 1100° F.

An essential feature of the present invention involves the simultaneous use of a fourth catalytic component with the lithiated alumina and platinum. As previously set forth, this component is selected from the group consisting of selenium, tellurium, compounds and mixtures thereof. Of these, tellurium is preferred since it appears to yield better results, and possesses an unusual affinity for the platinum component, such that it remains within the catalytic composite for a significantly longer period of time while processing the paraffinic charge stock. Similar to the method used for incorporation of the platinum and lithium components, the selenium and/or tellurium is most conveniently combined by way of an impregnating technique which utilizes the oxy-acids of these metals. Thus, selenious acid, tellurious acid, selenic acid and/or telluric acid, in aqueous solution, can be conveniently used as the source of these components. In general, the impregnation will be effected at about room temperature, followed by drying at a temperature of from 100° F. to about 300° F. There appears to be some evidence that a more favorable catalyst is produced when the platinium, lithium and tellurium, or selenium, are impregnated in that order. The precise reason for this apparent advantage is not known with accuracy, although it is theorized that the components, including the alumina, form a peculiar complex with each other such that additional stability is imparted.

Although it has been shown that platinum, as well as other noble metals, is very active for promoting the dehydrogenation of paraffinic hydrocarbons, it inherently possesses additional properties which are objectionable, and which stem from the overall ability and activity of noble metal components for promoting other kinds of reactions. The use of the alkali metal component, and particularly lithium, effectively inhibits a substantial amount of the cracking reactions by neutralizing at least a portion of the acid function exhibited by the platinum component. However, sufficient cracking activity remains such that higher temperature operation to increase conversion is precluded. Furthermore, there remains the inherent capability of the platinum to promote undesirable isomerization reactions. This is still further compounded by the additional fact that where higher temperature operation is instituted for the purpose of increasing the conversion of isobutane, there is an increase in the tendency for conversion to normal butane via isomerization. Thus, the enigma exists that, at a given temperature and conversion level, the addition of lithium for the purpose of decreasing cracking activity to permit operation at a higher temperature, to in turn increase conversion, falls short of economic acceptability due to the increased tendency toward isomerization, whereby the efficiency of conversion to the desired olefin suffers.

The primary function of the catalytic attenuator, selenium and/or tellurium, is to poison the platinum component selectively such that the remaining cracking activity is virtually eliminated, and the tendency to promote isomerization reactions is substantially curtailed. The uniqueness of these attenuators resides in the fact that the dehydrogenation activity is not adversely affected. As hereinafter indicated in a specific example, this doping action of the attenuator is highly selective in this regard. There is no dehydrogenation activity supplied by the attenuator, but rather a doping or poisoning effect directed toward the undesirable side reactions. Where two catalysts are prepared, one with a tellurium attenuator, and the other with one-half the quantity of platinum and no attenuator, the conversion in the case of the second catalyst decreased more than the cracking, whereas the attenuated catalyst inhibited cracking without decreasing conversion.

Furthermore, with the latter, there is experienced a decrease in the degree to which isomerization is affected.

Another advantage of the attenuated catalyst resides in the decreased production of di-olefins. The use of the attenuator modifies the ratio in which the two dehydrogenation steps leading to di-olefins, at the expense of mono-olefins, are affected, whereby the primary stage leading to the mono-olefin is not affected, but the secondary stage resulting in the di-olefin is reduced in intensity. There is also a suppression of polymerization of the monoolefins, the products from which become deposited within and throughout the catalytic composite. Through the increased conversion, the increased stability of the catalytic composite, the overall beneficial effect resides in the resulting economic considerations involved with the effective acceptable catalyst life and the total quantity of desired olefin produced.

The following examples are presented for the purpose of illustrating the dehydrogenation process hereinbefore described, and to indicate the benefits derived through the utilization thereof. It is not intended to limit the scope of the invention, as defined by the appended claims, to the catalyst, operating conditions, concentrations, charge stock, etc., used in these examples. Modification of these variables, within the aforesaid limits, may be made by those skilled in the art of petroleum refining operations, in order to achieve optimum economic advantage in a given situation.

The charge stock employed is commercial grade (99.0%) isobutane; and analysis of this stock shows an isobutane content of 99.7%, with 0.3% normal butane present. Analyses on the product gas stream are accomplished through gas chromatography, and the concentrations reported in mol percent. Values for conversion and efficiency are obtained by converting the $C_3$ and lighter components of the hydrocarbon portion to their equivalent $C_4$ values, and adjusting the resulting values to a basis of 100.0%. The conversion of isobutane is the difference between the residual isobutane and 100, and the efficiency is the net isobutylene produced divided by the conversion.

In all of the examples which follow, the catalyst employed is prepared utilizing spherical alumina particles formed in accordance with the well-known oil-drop method as detailed in U.S. Patent Number 2,620,314, issued to James Hoekstra. The catalysts contain either 0.75% or 0.375% by weight of platinum incorporated by way of an impregnating technique utilizing the proper quantity of dinitro-diamino platinum. Following evaporation to visual dryness, and drying in air for about one hour at 200° F., the platinum-impregnated alumina is calcined at about 1100° F. for about two hours. The lithium component is then incorporated, using the necessary quantity of lithium nitrate to produce catalysts of 0.33% and 0.50% lithium, in an impregnation procedure, and the composite again dried and calcined. Where the catalytic activity is intended to be attenuated, for example with tellurium, an aqueous solution of telluric acid, in a concentration required to produce the desired atomic ratio of tellurium to platinum, is used in a third impregnation technique, followed again by drying and calcination. It is understood, however, that the catalyst may be prepared in any suitable manner, and that no particular method is essential to, or limiting upon the present invention as defined by the scope and spirit of the appended claims.

In the examples, the catalyst is disposed, in an amount of 25 cc., in a stainless steel tube of ⅞-inch nominal inside diameter equipped with an inner spiral preheater. The operating conditions include a temperature of 575° C., a pressure of 10 p.s.i.g., the liquid hourly space velocity is either 2.0 or 4.0, and hydrogen is introduced with the charge in a mol ratio of 2:1 with respect to the paraffinic charge.

*Example I*

In this example, as well as those following, an individual test period is of twenty-one hours duration, with analyses being made during the first and twenty-first hours, by way of one-hour composite samples. A first test period at 10.0 p.s.i.g., 575° C., a 2:1 hydrogen to hydrocarbon mol ratio, and a liquid hourly space velocity of 2.0, using a non-lithiated alumina composite containing 0.75% by weight of platinum, indicates an isobutane conversion to isobutylene of about 22.8% during the first hour. The efficiency of conversion to isobutylene is 56.6%, and considerable cracking to $C_1$–$C_3$ paraffins is observed since 3.2 mol percent methane, 3.2 mol percent ethane and 10.3 mol percent propane results; also, the catalyst shows the deposition thereon of 3.50% by weight of carbon.

A second test period, without changing the conditions of operation, but with an alumina-platinum catalyst containing 0.33% by weight of lithium, increases the conversion to isobutylene to 28.2% (during the first hour), accompanied by an efficiency of conversion of 74.9%. The light paraffins produced are 1.9 mol percent methane, 0.4 mol percent ethane and 5.7 mol percent propane, and the catalyst analysis indicates carbon deposition of about 0.80% by weight. Of interest is the fact that, during the twenty-first hour, the composite sample analysis shows the isobutylene conversion to have decreased only to 28.0%, with the efficiency of conversion increasing to 90.5%. Furthermore, the cracking reactions are inhibited to the extent that only 0.4% methane, a trace quantity of ethane and 1.6% propane were produced.

A third test period, in which the catalyst contains tellurium in an atomic ratio of 0.31 to platinum, the latter present in an amount of 0.75% by weight, alumina and 0.5% by weight of lithium, is carried out under the same conditions of operation, with one exception. The residence time of the isobutane feed is lowered by increasing the liquid hourly space velocity to 4.0, from the 2.0 used in the two previous test periods. During the first hour, the isobutane conversion is 29.0%, and decreases only to 28.8% during the twenty-first hour. The yield of isobutylene during the twenty-first hour is 28.1% for an efficiency of conversion of 97.6%. The addition of the tellurium to the lithiated alumina-platinum catalyst virtually eliminated isomerization and cracking reactions, the total light paraffins, $C_1$–$C_3$, being about 0.4%, and only 0.30% by weight of carbon is deposited on the catalyst.

The results obtained during the third test period are even more surprising in view of the fact that the liquid hourly space velocity is twice that employed during the first two test periods. The following Table I summarizes the results of these three test periods:

TABLE I

| Period No. | 1 | 2 | 3 |
| --- | --- | --- | --- |
| Catalytic Components on Alumina | Pt | Pt-Li | Pt-Li-Te |
| Conversions, mol percent: | | | |
| Of Isobutane | | | 29.0 |
| To Isobutylene | 22.8 | 28.2 | 28.1 |
| Efficiency of Conversion | 56.6 | 74.9 | 97.6 |
| Light Paraffins Produced, mol percent: | | | |
| Methane | 3.2 | 1.9 | |
| Ethane | 3.2 | 0.4 | 0.4 |
| Propane | 10.3 | 5.7 | |
| Carbon on Catalyst, percent | 3.50 | 0.80 | 0.30 |

*Example II*

In order to attempt to determine the effect which the attenuators have upon the platinum component, three test periods, performed at operating conditions of 10.0 p.s.i.g., a temperature of 575° C., a hydrogen to hydrocarbon mol ratio of 2.0 and a liquid hourly space velocity of 4.0, are instituted with varying catalyst compositions. The three catalysts are: (a) alumina, 0.5% by weight of lithium, 0.75% by weight of platinum, and tellurium in an atomic ratio to platinum of 0.31; (b) alumina, 0.5% by weight of lithium and 0.75% by weight of platinum; and (c) alumina, 0.5% by weight of lithium and 0.375% by weight of platinum. The results are presented in the following Table II:

TABLE II

| Catalyst Designation | A | B | C |
|---|---|---|---|
| Platinum, wt. percent | 0.75 | 0.75 | 0.375 |
| Tellurium, Atomic Ratio | 0.31 | 0 | 0 |
| Lithium, wt. percent | 0.50 | 0.50 | 0.50 |
| Conversions, mol percent: | | | |
| Of Isobutane | 28.8 | 22.2 | 14.7 |
| To Isobutylene | 28.1 | 20.6 | 13.5 |
| Efficiency | 97.6 | 92.7 | 91.7 |
| Total Light Paraffins, mol percent | 0.4 | 1.3 | 0.9 |
| Carbon Deposition, wt. percent | 0.30 | 0.49 | 0.07 |

All the results given in Table II are those obtained during the twenty-first hour of each test period. Upon comparing catalyst (B) and (C), when the platinum content is halved, it will be noted that the overall activity of the catalyst decreases, although efficiency does not appear to be substantially affected, and that conversion has decreased to a greater extent than cracking. Upon comparing catalysts (A) and (B), the addition of tellurium is seen to result in a very substantial decrease in cracking, but no decrease in the conversion or the efficiency thereof. This leads to the conclusion that the effect of the attenuators is very selective with respect to the side reactions, and not merely one of removing effective platinum from total catalytic action.

*Example III*

Five test periods, each of twenty-one hours duration, are conducted at operating conditions of 10.0 p.s.i.g., a temperature of 575° C., a hydrogen to hydrocarbon mol ratio of 2.0, and a liquid hourly space velocity of 4.0. Five different catalytic compositions are prepared, each of which contains 0.5% by weight of lithium and 0.75% by weight of platinum, but varying concentrations of tellurium. The results are presented in Table III following:

TABLE III

| Catalyst Designation | D | E | F | G | H |
|---|---|---|---|---|---|
| Te/Pt, Atomic Ratio | 0 | 0.21 | 0.31 | 0.47 | 1.30 |
| Conversions, mol percent: | | | | | |
| Of Isobutane | 22.2 | 26.4 | 28.8 | 21.6 | 4.8 |
| To Isobutylene | 20.6 | 25.4 | 28.1 | 20.7 | 4.3 |
| Efficiency | 92.7 | 96.1 | 97.6 | 95.7 | 89.6 |
| Light Paraffins Produced | 1.3 | 0.7 | 0.4 | 0.6 | 0.4 |
| Carbon Deposition on Catalyst | 0.51 | 0.20 | 0.30 | 0.06 | 0.04 |

All the results appearing in Table III are those of the last hour of the 21-hour test period. When considering the quantity of isobutane converted, and the efficiency of the conversion to isobutylene, it is readily ascertained that the attenuator should be present in an amount to result in an atomic ratio to platinum of about 0.15 to about 0.50. When either below, or above this limitation, both the activity and efficiency of the catalyst are adversely affected.

The foregoing specification and examples indicate the method involved in the process of the present invention and clearly show the benefits to be afforded through the utilization thereof. Through the use of the present process and catalyst, the dehydrogenation of paraffinic hydrocarbons can be carried out with a substantial degree of conversion in high efficiency, and for an extended period of time.

We claim as our invention:

1. A process for dehydrogenating a paraffinic hydrocarbon which comprises contacting said paraffinic hydrocarbon with a catalytic composite of alumina, from about 0.01% to about 1.5% by weight of lithium, from about 0.05% to about 5% by weight of a Group VIII noble metal component and a metallic component selected from the group consisting of tellurium, selenium and compounds thereof, and at dehydrogenation conditions including a temperature within the range of from about 400° C. to about 700° C., the second-mentioned metallic component being in sufficient amount to inhibit the cracking and isomerizing activity of said Group VIII component at said conditions.

2. The process of claim 1 further characterized in that said catalytic composite comprises palladium.

3. The process of claim 1 further characterized in that said catalytic composite comprises platinum.

4. The process of claim 1 further characterized in that said metallic component selected from the group consisting of tellurium, selenium and compounds thereof is present within said catalytic composite in an atomic ratio to platinum of from about 0.15 to about 0.50.

5. The process of claim 1 further characterized in that said paraffinic hydrocarbon is isobutane.

6. The process of claim 1 further characterized in that said paraffinic hydrocarbon is normal butane.

7. A catalytic composite of alumina, from about 0.01% to about 1.5% by weight of lithium, from about 0.05% to about 5% by weight of a Group VIII noble metal component and a metallic component selected from the group consisting of selenium, tellurium, and mixtures thereof in an atomic ratio to the Group VIII component of from about 0.15 to about 0.50.

8. The catalytic composite of claim 7 further characterized in that said noble metal component comprises platinum.

References Cited by the Examiner
UNITED STATES PATENTS
3,126,426   3/1964   Turnquest et al. ____ 260—683.3

DELBERT E. GANTZ, *Primary Examiner.*

G. E. SCHMITKONS, *Assistant Examiner.*